United States Patent Office 2,900,303
Patented Aug. 18, 1959

2,900,303

SEED TREATING COMPOSITION COMPRISING IRON OXIDE, CALCIUM CARBONATE AND A WATER-INSOLUBLE COPPER SALT

Ernest McWilliams, East Aurora, N.Y., assignor to The Stanford Seed Co., Inc., Buffalo, N.Y.

No Drawing. Application February 6, 1957
Serial No. 638,438

4 Claims. (Cl. 167—46)

The present invention relates to a composition suitable for use as a coating dust for seeds and particularly cereal grain seeds, so that the seed is rejected as edible by birds, fowl and rodents.

Planting seed, particularly cereal grain seeds, is unearthed and consumed as food to a considerable degree by birds, fowl and rodents, and the present invention is designed to render such seed so inedible or unpalatable, or both, as to be rejected as food by such predators.

In accordance with the present invention, a composition is provided which is mainly inorganic in nature and which, in finely ground condition, may be employed as a coating upon seed grains to the end that the seed grain is not consumed as food by rodents, birds, or fowl, either before or after planting.

Furthermore, the composition is not deleterious to the life of the fowl or rodent but if rejected as a food remains in a condition where it may subsequently germinate.

In general, the coating composition is inorganic in nature and contains water insoluble ingredients so that these ingredients do not have an adverse effect upon the germination of the seed. In general, the inorganic constituents are an oxide of iron and, generally, it is preferred that finely ground, red iron oxide be one of the constituents admixed with another constituent such as finely ground limestone or calcium carbonate. In general, the iron oxide will be present from about 33% to 75% and the ground limestone from 66% to 25% by weight.

In addition to the ferric oxide and calcium carbonate the composition contains a water insoluble copper salt, as for instance, copper oxalate.

Substantially equal parts by weight of calcium carbonate and ferric oxide are ground together with from about 2 to about 10% of the insoluble copper salt. The grinding may be performed in any suitable grinding equipment which is capable of comminuting these materials to a fineness of subdivision substantially equivalent to so-called pigment size, the comminuted material passing a 100 mesh sieve. Generally it is preferred to grind to —200 mesh. The manipulation of the grinding action produces uniform distribution of the copper oxalate, ferric oxide and calcium carbonate through the resultant powder or dust.

The composition is applied to the seed prior to planting, in any suitable fashion, as for instance by dusting the composition on the seed or by mixing the seed and the coating composition in a tumbling barrel or by any other conventional procedure. The amount of coating composition employed will depend upon the type of seed, its size and weight per bushel. In general, the coating composition is used from about ½ percent to about 12% based on the weight of the seed. Thus, excellent treating results have been obtained by employing about 12 ounces of the composition per bushel of corn, i.e., about 1.2% by weight.

It would appear that there is probably an electrostatic attraction between the coating composition and the seed which maintains the finely ground material on the exterior of the seed. Thus, corn coated at an application rate, as indicated above, was run through a corn planter three times, and the characteristic red appearance of the coated corn was undisturbed; the coating appearing not to have been dislodged to any substantial degree from the corn by reason of passage through the corn planter.

The coating composition of the present invention does not adversely affect the germinating level of the seed. In accelerated germination tests, corn, oats, and wheat treated in accordance with the principles of the present invention, possess the same germination level as a sample of the same cereal not treated. These specific results of the accelerated germination and of potted seed is set forth in the table below.

Table 1

| Sample | Germination Rate, Percent | Average, Percent |
|---|---|---|
| Corn check Sample 1 | 93 | 92 |
| Corn check Sample 2 | 91 | |
| Treated corn (1.2% coating) (1) | 92 | 91 |
| Treated corn (1.2% coating) (2) | 90 | |

The germination rate was determined by the standard test in a standard corn germinator at the standard temperature, humidity and light exposure upon 200 kernels per sample, and after 7 days of exposure a count made of emergence of roots and sprouts, the final count thereof being expressed as percent germination. All of the results in Table 1 above (90% to 93%) being within the limit of error of the standard procedure, the results obtained indicate no adverse effect upon the germination rate by reason of the coating.

Corn treated with the composition of the present invention was fed to pheasants, one of the greatest predators of planted corn, and the so treated corn was rejected as a food, even though the pheasants had been without food for two days prior to the offering of the treated corn.

In like manner, treated cereal grains of all kinds, namely, corn, wheat, oats, rice, buckwheat and barley, were rejected as food by the usual rodents, namely rats, moles and muskrats.

If it be desired, the composition may contain as an admixture an insecticide and, to this end, some 2 to 8% or so of the usual insecticides may be incorporated in the coating composition by grinding the same with the inorganic constituents. An insecticide particularly suitable for this purpose is Dieldrin (1,2,3,4,10,10-hexachloro - 6,7 - epoxy-1,4,4a,5,6,7,8,8a-octahydro-1,4,5,8-dimethanonaphthalene), although other normally employed insecticides, such as DDT, BHC, chlorhexane, toxaphene may be employed.

What is claimed is:

1. A composition for coating seed grain to cause predator birds from consuming seed grain coated therewith, comprising a finely ground mixture passing 200 mesh of oxide of iron, calcium carbonate and a water-insoluble copper salt, the oxide of iron being from about 33 to 75 parts by weight of the composition and the calcium carbonate from about 66 to 25 parts by weight of the composition, the water insoluble copper salt being in the range of 2% to 10% by weight of the total composition.

2. A composition for coating seed grain to cause predator birds from consuming seed grain coated therewith comprising a finely ground mixture passing 200 mesh of oxide of iron, calcium carbonate and copper oxalate, the oxide of iron being from about 33 to 75 parts by weight of the composition and the calcium carbonate from about 66 to 25 parts by weight of the composition, the copper oxalate being in the range 2% to 10% by weight of the total composition.

3. The method of repelling predator birds from consuming seed grain as food which comprises coating the seed grain with from ½% to 12% by weight of a finely ground mixture, passing 200 mesh of oxide of iron, calcium carbonate and a water insoluble salt of copper, the oxide of iron being from about 33 to 75 parts by weight of the composition and the calcium carbonate from about 66 to 25 parts by weight of the composition, the water-insoluble copper salt being in the range 2% to 10% by weight of the total composition.

4. The method of repelling predator birds from consuming seed grain as food which comprises coating the seed grain with from ½% to 12% by weight of a finely ground mixture, passing 200 mesh of oxide of iron, calcium carbonate and copper oxalate, the oxide of iron being from about 33 to 75 parts by weight of the composition and the calcium carbonate from about 66 to 25 parts by weight of the composition, the copper oxalate being in the range 2% to 10% by weight of the total composition.

References Cited in the file of this patent

UNITED STATES PATENTS

| | | |
|---|---|---|
| 424,843 | Young | Apr. 1, 1890 |
| 631,738 | Dowie et al. | Aug. 22, 1899 |
| 1,783,200 | Rossner et al. | Dec. 2, 1930 |
| 2,676,132 | Bluestone | Apr. 20, 1954 |

FOREIGN PATENTS

| | | |
|---|---|---|
| 593,435 | Great Britain | Oct. 16, 1947 |

OTHER REFERENCES

Shell Chem. Corp., Handbook of Aldrin, Dieldrin and Endrin Formulations, December 1954.